Patented Aug. 21, 1945

2,383,304

UNITED STATES PATENT OFFICE 2,383,304

INSECTICIDAL MIXTURE

Robert J. Geary, Blue Point, N. Y.

No Drawing. Application July 8, 1943,
Serial No. 493,899

8 Claims. (Cl. 167—24)

The present invention relates to insecticidal compositions and is particularly concerned with mixtures of insecticidal plant products adapted for combating both household and agricultural insect pests.

Extracts of such insecticidal plant products as pyrethrum flowers and rotenone-containing materials, e. g., derris, cube, timbo, barbasco, and the like, have been widely used for the control of insect pests. These toxicants are generally employed as consituents of dusting mixtures, petroleum distillate sprays, or in aqueous dispersion. Pyrethrin-containing compositions have a quick paralyzing action on flies and other insects, but give a relatively low kill as compared to the per cent knockdown. With rotenone-containing materials, a high moribund control is obtained, but a considerable period of time is required to destroy insect pests. In spite of these disadvantages, rotenone insecticides have enjoyed popularity both in household use and in the control of insect and mite pests by both dusting and spraying operations. Unfortunately, rotenone-producing plants grow principally in tropical areas well removed from such major parasiticide markets as the United States and other densely populated and agricultural areas of the Temperate Zone. The problems involved in harvesting and transporting such products as derris root renders the supply uncertain, and results in a relatively high cost for rotenone toxicants. Also, there exists at the present time such a shortage of rotenone products as has caused restrictions to be placed on their use, whereby a serious need exists for an adequate substitute.

The yam bean has been recently suggested as a source of insecticidal plant toxicant. This bean belongs to the genus Pachyrrhizus and is known in several distinct species and varieties. Representative of such species are *Pachyrrhizus erosus* and *Pachyrrhizus palmatilobus*. These plants are widely cultivated in Mexico under the name "jicama." *Pachyrrhizus erosus* is popularly called "jicama de agua" in reference to the watery juice in the roots. *Pachyrrhizus palmatilobus* is similarly termed "jicama de leche" and is characterized by a milky juice in its tubers. Other forms of yam bean are *Pachyrrhizus tuberosus* and *Pachyrrhizus ahipa*. All of the foregoing plants produce yam-like tubers which are edible either raw or cooked, and constitute a common item of diet in tropical and subtropical countries. In addition, the plants produce a heavy yield of beans which, in finely-divided form, have insecticidal properties, and which may be extracted with organic solvents to obtain oily or resinous extraction residues embodying the effective insecticidal constituents of the bean.

Potential advantages in the yam bean include the fact that it can be grown well into the Temperate Zone, and that the by-product tubers constitute an article of commerce adapted materially to lower the cost of the bean as employed in the compounding of insecticidal mixtures. A further by-product adapted for commercial exploitation is the insoluble residue from extraction processes. These residues being high in nitrogen and comparatively free of the toxic insecticidal principles, are being investigated as cattle food and as a constituent of fertilizers.

Unfortunately, the yam bean and its derivatives do not appear to be the equivalent of rotenone or to be sufficiently toxic as to satisfy the requirements of the pest control industry for a non-metallic contact and stomach poison which will be at the same time relatively non-toxic to humans.

In comparative determinations, insecticidal yam bean products have been found not to be the equivalent of rotenone as evidenced by the failure of the former to control insect species against which rotenone is recognized as specific. Although giving a reaction in certain of the qualitative tests for rotenone, analysis and examination of the yam bean, whether in ground form or as an oily extract residue, indicates the substantial absence of rotenone therein.

It is an object of the present invention to provide a new composition of matter in which the yam bean products are so modified that the ultimate composition has a high insecticidal efficiency. It is a further object to provide such a modified composition adapted to be employed as a substitute for rotenone. A further object is the provision of parasiticidal sprays and dusts adapted to be employed for the control of household and agricultural insect pests which will have insecticidal properties in excess of the additive characteristics of their ingredients. An additional object is the provision of insecticidal compositions which will give a quicker and higher kill of household and agricultural pests than do pyrethrins or the yam bean alone. Other objects will become apparent from the following description.

I have discovered that mixtures of an insecticidal yam bean product with pyrethrins have a greatly increased effectiveness against insect pests. Dust and spray compositions comprising such a mixture as an effective toxicant have a greater paralyzing effect and a greater lethal effect on insects than do compositions comprising an equivalent amount of either the pyrethrins or yam bean alone. By employing such combination of parasiticidal materials, significant economies in the required amounts of pyrethrin are accomplished, and the pyrethrins and yam bean product so supplement one another as to result in a greater than additive control of insect pests. That is to say, a synergistic effect is obtained. Also certain naturally occurring oily and resinous constituents of the yam bean act as dispersing and wetting agents to improve the properties and enhance the effectiveness of sprays in which the toxicant mixture may be employed.

In operating according to the present invention, the yam bean is preferably employed in the form of a finely-divided product obtained by grinding the whole bean, or as an oily or resinous residue obtained by the extraction of the ground bean with organic solvents and subsequent evaporation of the solvent from the extract. Solvents which have been so employed include acetone, carbon tetrachloride, ethylene chloride, chloroform, propylene chloride, benzene, methyl alcohol, ethyl alcohol, propyl alcohol, volatile petroleum distillates or mixtures of two or more of such solvent materials. By intelligent selection of the particular solvents employed, a rough quantitative separation of the oily and/or resinous constituents is possible whereby extract residues of varying physical properties and insecticidal activity may be obtained.

The new compositions may take the form of concentrates, sprays, or dusts depending upon the particular type of application for which they are designed. Thus, a mixture of yam bean extract and pyrethrins or pyrethrum resins may be modified with a suitable wetting and dispersing agent and employed as a concentrate adapted to be diluted with water to give spray compositions. Similarly, a mixture of the two toxic extracts may be dispersed on a finely-divided solid carrier to form a concentrate. An alternate method of procedure comprises depositing pyrethrin or pyrethrum resins in and on finely-ground yam beans. The latter composition may thereafter either be diluted with an inert finely-divided solid carrier or dispersed in water to form dust or spray compositions for use in the control of agricultural and household insect pests.

In the preparation of sprays, the mixture of insecticidal yam bean product and pyrethrins or pyrethrum resins may be dissolved in a non-corrosive organic solvent such as low boiling petroleum distillate, and employed without further modification as a household insecticide for the control of flies, mosquitoes, roaches and the like. Alternately, the mixture of toxicants may be dispersed directly and with the assistance of suitable emulsifying or wetting agents into an amount of water calculated to yield a spray composition of the desired toxicant concentration.

In preparing dusts, a solution in volatile organic solvent of the toxicant mixture may be employed to wet a finely-divided carrier, and the organic solvent thereafter evaporated to obtain a free-flowing intimate mixture of the carrier, pyrethrins, and yam bean product. Also, dust compositions may be prepared by mixing together a conventional pyrethrin dust with finely-ground yam bean.

The amounts of materials employed vary appreciably with the type of composition and the particular insect it is desired to control. In preparing dusts, from about 5 to about 50 pounds by weight of ground yam bean may be employed in each 100 pounds of ultimate mixture or, if desired, the extract from such amount of beans may be substituted therefor. In aqueous spray compositions either the ground yam bean product or the extract from between 2 and 50 parts by weight of bean are employed for each 100 parts of spray mixture. In non-aqueous compositions, such as fly sprays, etc., the extract residue from 5–50 parts of the beans is preferably employed in each 100 parts by weight of final spray mixture.

The pyrethrins are conveniently used in the form of a crude pyrethrum resin containing approximately 20 per cent by weight of the active toxic principle. The amount of this resinous product employed in dust mixtures runs from about 0.025 to 0.5 per cent by weight of the ultimate composition. In aqueous spray mixtures from about 0.001 to 0.05 per cent by weight is preferred. In non-aqueous products, such as fly sprays, from about 0.25 to 2.0 milligrams of pyrethrin per milliliter of spray has been found to give satisfactory results. In the preparation of concentrates, pyrethrum resin may be mixed directly with ground yam beans or with the concentrated extract residue therefrom in any desired proportion.

Common dust carriers which may be employed in combination with the toxicant mixtures as herein described are diatomaceous earth, bentonite, volcanic ash, kieselguhr, white talc, pyrophyllite, wood flour, gypsum, and the like. Suitable non-corrosive organic solvents for use in the preparation of spray mixtures include petroleum distillates, benzene, ethylene chloride, propylene chloride, methylene chloride, hydrogenated naphthalene, butyl alcohol, methyl-ethylketone, etc. Also conventional agricultural oil emulsion products may be employed as carriers. Among the wetting and dispersing agents which appear to be compatible with the mixtures as described are alkali metal salts or sulphonated alcohols, sulphonated alkylphenyl-phenols and their salts, alkyl esters of sulpho-succinic acid, complex esters of long-chain fatty acids, etc.

The following examples illustrate the invention but are not to be construed as limiting:

*Example 1*

A commercial extract of yam bean, prepared by extracting the ground bean with acetone, filtering the extract, and vaporizing off the acetone, was employed in insecticidal concentrates both as the sole toxic ingredient and in combination with a standard pyrethrum extract containing 20 per cent of pyrethrins. The composition of the basic mixture was as follows:

| | Grams |
|---|---|
| Yam bean extract residue | 15 |
| Pyrethrum extract (20% pyrethrins) | 5 |
| Acetone | 10 |
| Sodium dioctyl sulpho-succinate | 2 |
| Soya bean oil | 68 |

One part by weight of the foregoing oily mixture was dispersed in 400 parts of water to obtain a spray composition. This aqueous product was applied for the control of red spiders and found to give a kill of 65 per cent. In an analogous determination, the 5 grams of pyrethrum extract in the basic mixture was replaced with 5 grams of water to obtain a composition embodying the yam bean extract as the sole toxic ingredient and which, at a dilution of 1 to 400 in water, gave a kill of 30 per cent against red spider. Similarly, the basic composition was again modified by replacing the 15 grams of yam bean product with 15 grams of water and this composition, containing pyrethrins as the sole toxic ingredient, found to give a kill against red spider of but 23 per cent at a dilution of 1 to 400. It was apparent that the 65 per cent control obtained with the mixture of toxicants constituted a synergistic result by being greater than additive for the two toxicants.

Example 2

In an analogous series of determinations, a basic composition was prepared from an oily residue obtained by the extraction of jicama beans of Mexican origin. This basic composition was as follows:

|  | Grams |
| --- | --- |
| Oily fraction jimaca extract | 50 |
| Mannitan mono-laurate | 12 |
| Pyrethrum resins (20% pyrethrins) | 5 |
| Water | 33 |

This composition, at a dilution of 1 to 400, gave a kill against red spider of 90 per cent. When the jicama extract was replaced by water, the pyrethrins alone gave a kill of 31 per cent. When the pyrethrum resin was replaced by water, the jicama extract alone gave a kill of 32 per cent. Here again the result obtained with the combination of yam bean product and pyrethrins was greater than additive.

Example 3

Mexican yam beans identified as *Pachyrrhizus erosus*, and popularly known as "jicama de agua," were ground and extracted with carbon tetrachloride. The extract was filtered and warmed to evaporate off the solvent. An amount of the resulting extract residue equivalent to that obtainable from 20 grams of beans was diluted with sufficient light petroleum distillate to give 100 milliliters of solution. This product was employed as a fly spray, according to the Peet-Grady method, and found to give a kill against 5-day old houseflies of 25 per cent. A further determination was carried out in which an amount of extract equivalent to that obtained from 10 grams of beans was mixed with 50 milligrams of pyrethrins and this mixture diluted with light petroleum distillate to give 100 milliliters of solution. When applied for the control of houseflies according to the Peet-Grady method, this spray gave a kill of 70 per cent in 24 hours. The pyrethrins alone were found to be effective against flies to the extent of only 20 per cent in 24 hours.

A similar series of determinations was carried out with the oily residue from the carbon tetrachloride extraction of ground yam beans of the specie *Pachyrrhizus palmatilobus* (jicama de leche). In this operation, a spray containing the extract from 20 grams of beans per 100 milliliters gave a kill of 20 per cent in 24 hours. An analogous composition containing the extract from 10 grams of beans and 50 milligrams of pyrethrins per 100 milliliters, killed 77 per cent in 24 hours.

Example 4

A composition for the control of pea aphid is prepared by grinding together 20 parts by weight of yam beans (jicama de leche) and 80 parts of diatomaceous earth, wetting the resulting product with a solution in volatile organic solvent of an amount of pyrethrum resin containing 0.1 part by weight of pyrethrins, and drying the mixture to evaporate off solvent. The resulting free-flowing intimate mixture of diatomaceous earth, pyrethrins and yam bean, is adapted to be applied in conventional agricultural dusting apparatus directly to plants infested by aphis.

Example 5

In a similar fashion, a dust mixture for the control of first instar Mexican bean beetle is prepared by wetting 90 parts by weight of talc with a solution in volatile organic solvent of the acetone extract from 10 parts by weight of yam beans (jicama de agua) and 0.1 part by weight of 20 per cent pyrethrum extract, and thereafter evaporating off the volatile solvent. This product is adapted to be dusted on bean foliage without any appreciable injury thereto to obtain high kills of the bean beetle larvae.

I claim:
1. An insecticidal composition comprising as active toxic ingredients pyrethrins and an insecticidal product selected from the group consisting of finely-ground yam bean and extracts of yam bean.
2. An insecticidal spray comprising as active toxic ingredients pyrethrins and an insecticidal product selected from the group consisting of finely-ground yam bean and extracts of yam bean.
3. An insecticidal dust comprising as active toxic ingredients pyrethrins and an insecticidal product selected from the group consisting of finely-ground yam bean and extracts of yam bean.
4. An insecticidal composition comprising as active toxic ingredients pyrethrins and an insecticidal extract of yam beans.
5. An insecticidal composition comprising as active toxic ingredients pyrethrins and finely-ground yam beans.
6. An insecticidal spray comprising a solution in non-corrosive organic solvent of pyrethrins and of an insecticidal extract of yam beans.
7. An insecticidal dust comprising a free-flowing intimate mixture of a finely-divided carrier, pyrethrins, and finely-ground yam beans.
8. An insecticidal dust comprising a free-flowing intimate mixture of a finely-divided carrier, pyrethrins, and an insecticidal extract of yam beans.

ROBERT J. GEARY.